US011719783B2

(12) United States Patent
Amarnathan et al.

(10) Patent No.: US 11,719,783 B2
(45) Date of Patent: Aug. 8, 2023

(54) SYSTEMS AND METHODS FOR CROSS-REFERENCE NAVIGATION USING LOW LATENCY COMMUNICATIONS

(71) Applicant: Honeywell International Inc., Morris Plains, NJ (US)

(72) Inventors: Mohandas Amarnathan, Bangalore (IN); George Rajan Koilpillai, Bangalore (IN); Sreenivasan Govindillam, Bangalore (IN); Ramakrishnan Raman, Bangalore (IN); Shunmugavel Madasamy, Bangalore (IN); Yogananda Vasudev Jeppu, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/073,140

(22) Filed: Oct. 16, 2020

(65) Prior Publication Data
US 2022/0057473 A1    Feb. 24, 2022

(30) Foreign Application Priority Data
Aug. 21, 2020   (IN) .............................. 202011036089

(51) Int. Cl.
| | |
|---|---|
| *G01S 5/02* | (2010.01) |
| *G01S 19/25* | (2010.01) |
| *H04W 4/44* | (2018.01) |

(52) U.S. Cl.
CPC .......... *G01S 5/0289* (2013.01); *G01S 5/0231* (2013.01); *G01S 19/252* (2013.01); *H04W 4/44* (2018.02)

(58) Field of Classification Search
None
See application file for complete search history.

(56) References Cited

U.S. PATENT DOCUMENTS

| | | | |
|---|---|---|---|
| 7,979,172 B2 | 7/2011 | Breed | |
| 9,177,476 B2 | 11/2015 | Breed | |
| 2017/0160401 A1* | 6/2017 | Lei | ................... G08G 1/096741 |
| 2021/0125009 A1* | 4/2021 | Lee | .......................... H04L 67/12 |
| 2021/0168574 A1* | 6/2021 | Zhang | ................... H04L 5/0048 |

(Continued)

FOREIGN PATENT DOCUMENTS

| | | |
|---|---|---|
| EP | 3179275 A1 | 6/2017 |
| EP | 3318843 A2 | 5/2018 |

(Continued)

*Primary Examiner* — Ernest G Tacsik
(74) *Attorney, Agent, or Firm* — Bookoff McAndrews, PLLC

(57) ABSTRACT

Disclosed are methods, systems, and non-transitory computer-readable medium for vehicle navigation processing. For instance, the method may include scanning for one or more terminals within a predetermined vicinity of the vehicle via a low latency communication network and receiving positional data of the one or more terminals via the low latency communication network. The method may further include receiving directional data of the one or more terminals relative to the vehicle, determining a first location of the vehicle relative to the one or more terminals based on the directional data, and determining a second location of the vehicle relative to the environment based on the positional data and the first location.

20 Claims, 4 Drawing Sheets

(56) References Cited

U.S. PATENT DOCUMENTS

| | | | |
|---|---|---|---|
| 2021/0219308 A1* | 7/2021 | Chen | H04W 28/065 |
| 2021/0221332 A1* | 7/2021 | Liu | H04L 9/3239 |
| 2021/0266867 A1* | 8/2021 | Das | H04W 72/02 |
| 2021/0354722 A1* | 11/2021 | Kim | G08G 1/096725 |
| 2021/0362733 A1* | 11/2021 | Yoon | B60R 16/04 |
| 2022/0021440 A1 | 1/2022 | Perruchot et al. | |

FOREIGN PATENT DOCUMENTS

| | | |
|---|---|---|
| WO | 2019052645 A1 | 3/2019 |
| WO | 2020104677 A1 | 5/2020 |

* cited by examiner

SYSTEMS AND METHODS FOR CROSS-REFERENCE NAVIGATION USING LOW LATENCY COMMUNICATIONS

CROSS-REFERENCE TO RELATED APPLICATIONS

This application claims the benefit of priority under 35 U.S.C. § 119 from Indian Patent Application No. 202011036089, filed on Aug. 21, 2020, the contents of which are incorporated by reference in their entirety.

TECHNICAL FIELD

Various embodiments of the present disclosure relate generally to the field of navigation for urban air mobility vehicles and, more particularly, to systems and methods for cross-referencing navigation using low latency communication networks and/or vehicle sensors.

BACKGROUND

Global Navigation Satellite Systems (GNSS) are generally utilized to provide navigation for urban air mobility (UAM) vehicles. However, an onboard GNSS of a UAM vehicle may experience difficulties or failure during an active flight such that the location determination capabilities of the GNSS may be rendered inoperable. UAM vehicles generally include constrained resource requirements (e.g., energy, payload, weight, etc.) while requiring stringent safety standards. Therefore, it may be a challenge hosting an exclusive (redundant) secondary navigation system and relatively large software processing power onboard a UAM vehicle while maintaining the stringent safety standards. Even with the recent advances in communication, computing, and sensing technologies, it may be a challenge to build an integrated, low-cost secondary navigation onto UAM vehicles.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for cross-referencing positional data of a vehicle for supplemental navigation processing.

For instance, a method for vehicle navigation processing of a vehicle within an environment may include scanning for one or more terminals within a predetermined vicinity of the vehicle via a low latency communication network; receiving positional data of the one or more terminals via the low latency communication network; receiving directional data of the one or more terminals relative to the vehicle; determining a first location of the vehicle relative to the one or more terminals based on the directional data; and determining a second location of the vehicle relative to the environment based on the positional data and the first location.

Moreover, a cross-vehicle navigation system of a vehicle may include a navigation sensor; at least one processor; and at least one non-transitory computer-readable medium storing instructions that, when executed by the at least one processor, cause the at least one processor to perform operations comprising: communicating with a terminal located within a communication range of the vehicle via a low latency network; receiving positional data of the terminal via the low latency network; receiving directional data of the terminal relative to the vehicle; determining a first location of the vehicle relative to the terminal based on the directional data; and determining a second location of the vehicle relative to an operating environment of the vehicle based on the first location and the positional data.

Moreover, a method for navigating a vehicle within an environment may include identifying a plurality of terminals located within a predetermined radio communications range of the vehicle; requesting directional data of the plurality of terminals, wherein the directional data of the plurality of terminals is relative to the vehicle; determining a local location of the vehicle relative to the plurality of terminals based on the directional data; requesting positional data of the plurality of terminals from the plurality of terminals via a low latency communication signal, wherein the positional data of the plurality of terminals is relative to the environment; and determining a global location of the vehicle relative to the environment based on the positional data and the local location.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
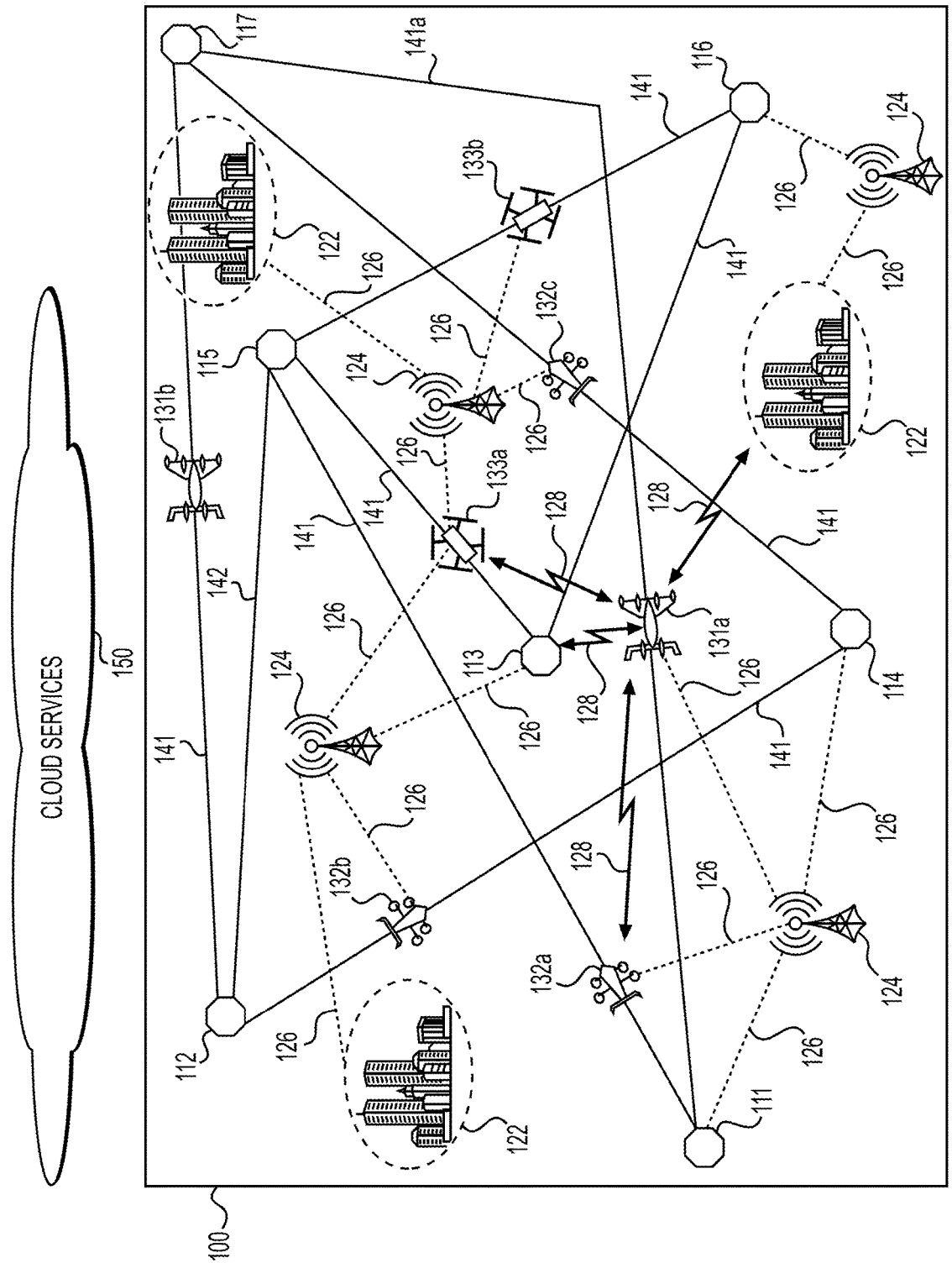
FIG. 1 depicts an example environment in which methods, systems, and other aspects of the present disclosure may be implemented.

Various embodiments of the present disclosure relate generally to the field of navigation for urban air mobility vehicles and, more particularly, to systems and methods for cross-referencing navigation using low latency communication networks and/or vehicle sensors.

The present disclosure is directed to overcoming one or more of the challenges discussed above in the BACKGROUND. As UAM vehicles generally operate near other vehicles, such as, for example, alongside other UAM vehicles in a fleet, UAM vehicles may be able to make use of a Global Positioning System (GPS), directional radar system, and/or other navigation modules of nearby vehicles when experiencing local failure of the GNSS and/or radar.

Additionally, as UAM vehicles generally operate closer to the ground surface than other traditional aircraft, various communications infrastructure may be more accessible, such as, for example, those of nearby buildings and/or structures. Accordingly, UAM vehicles may be able to make use of such communication networks when encountering GNSS or radar failure.

In general, the present disclosure is directed to supplemental or backup processing of certain avionics functionality, such as, for example, a real-time location determination of a vehicle. For instance, the methods and systems of the present disclosure may enable a vehicle to receive positional data via low latency wireless networks (e.g., 5G communication networks) from nearby entities. Loss of actuation systems needed to operate a UAM vehicle, such as positioning systems (e.g., GNSS, radar, GPS, cameras, inertial reference system (IRS), etc.), is one of the most time sensitive failures to manage in UAM vehicles as well other types of aircraft, as the loss might detrimentally affect safe operation of these vehicles. The methods and/or systems of the present disclosure for retrieving location data from other avionics applications may have an advantage of providing a supplemental navigation and/or radar system in the event of failure of local systems onboard the vehicle.

Moreover, navigation may be a significant challenge for UAM vehicles as the operating environment may be at relatively low altitudes and with a vehicle density that is multifold compared to other traditional aircraft. For instance, a GNSS and/or radar availability may be limited or the signal quality may be significantly degraded (e.g., below a signal threshold) in the UAM environment due to various factors. For example, the radio and/or optical ranging of UAM vehicles may be impaired by canyon effects or poor visibility or intentional malicious jamming of GNSS signals, obstructions formed by tall natural obstacles (e.g., hills, mountains, etc.) or erected structures on the ground (e.g., buildings, etc.), and/or poor visibility due to weather conditions (e.g., smog, fog, rain, etc.). Therefore, by communicating with nearby vehicles and/or structures through low latency wireless networks, UAM vehicles may be able to maintain safe air navigation even when an onboard navigation module malfunctions or otherwise becomes inoperable.

The systems and methods of the present disclosure may provide a vehicle with a supplemental navigation processing capability by enabling cross-referencing of a position, bearing, and range of other vehicles using beacon triangulation, ground radio based references, digital adaptive phased array radars (DAPA), and/or known proximate vehicle positions to substitute for an inoperable or otherwise unreliable navigation system and/or radar sensors. While this disclosure describes the systems and methods with reference to aircraft, it should be appreciated that the present systems and methods are applicable to various other vehicles, including those of drones, automobiles, ships, spacecraft, or any other manned, unmanned, autonomous, and/or internet-connected vehicles.

FIG. 1 depicts an example environment in which methods, systems, and other aspects of the present disclosure may be implemented. The environment of FIG. 1 may include an airspace 100 and one or more hubs 111-117 representing, for example, a ground facility where aircraft may take off, land, or remain parked (e.g., airport, vertiport, heliport, vertistop, helistop, temporary landing/takeoff facility, or the like). Airspace 100 may accommodate various types of aircraft 131-133 flying at various altitudes and along various routes 141. Aircrafts 131-133 may include any apparatus or vehicle of air transportation capable of traveling between two or more hubs 111-117, such as, for example, an airplane, a UAM, a vertical take-off and landing aircraft (VTOL), a drone, a helicopter, an unmanned aerial vehicle (UAV), a hot-air balloon, a military aircraft, and the like.

Any one of the aircrafts 131-133 may be connected to another and/or to one or more hubs 111-117 over a communication network using a vehicle management computer corresponding to each of the aircraft 131-133 or hub 111-117. As described in further detail below, each vehicle management computer may comprise a computing device and/or a communication device. As illustrated in the example of FIG. 1, different types of aircraft 131-133 may share airspace 100, such as a first aircraft model 131 (e.g., aircrafts 131a and 131b), a second aircraft model 132 (e.g., aircrafts 132a, 132b, and 132c), a third aircraft model 133 (e.g., aircrafts 133a and 133b), and so forth. Airspace 100 may be positioned adjacent to and/or over one or more structures 122 (e.g., buildings as well as other types of man-made or natural structures).

Still referring to FIG. 1, the one or more aircraft 131-133 may be traveling between two or more hubs 111-117 along one or more of the routes 141. In FIG. 1, a first aircraft 131a may be traveling from a first hub 111 to a second hub 117 along a first route 141a. During travel, each of the aircraft 131-133 may be positioned within proximity to one or more other aircraft 131-133 and/or structures 122. Hubs 111-117 and/or structures 122 may comprise ground stations that include a transponder system, a radar system, and/or a datalink system.

For example, a radar system implemented on hubs 111-117 and/or structures 122 may include a directional radar system that may be pointed upward (e.g., from the ground towards a sky) and may transmit a beam (e.g., a narrow beam) to provide three-dimensional coverage over a section of one or more routes 141 overhead. The three-dimensional coverage of the beam (not shown in FIG. 1) may be directly above hubs 111-117 and/or structures 122. The directional radar system may be configured to detect objects nearby or above hubs 111-117 and/or structures 122, such as, for example, aircraft 131-133 located within the three-dimensional coverage of the beam.

In some examples, the three-dimensional coverage of the beam may be at various skewed angles relative to a vertical direction from hubs 111-117 and/or structures 122. For example, the beam may be skewed at an angle to detect objects arriving at, descending to, and landing on hubs 111-117. The directional radar system may detect objects by detecting an exterior surface of the object. The beams may be controlled either mechanically (e.g., by moving the radar system), electronically (e.g., phased arrays), by software (e.g., digital phased array "DAPA" radars), or any combination thereof.

In other examples, a transponder system implemented on hubs 111-117 and/or structures 122 may include an automatic dependent surveillance-broadcast (ADS-B) and/or a Mode S transponder, and/or various other suitable transponder systems. The transponder system may have at least one directional antenna configured to target a section of one or more routes 141. For instance, targeting a section of route 141 may reduce the likelihood of overwhelming the ecosystem (e.g., aircraft 131-133) with interrogations, as would be the case if the transponder system used an omnidirectional antenna. The directional antenna may be configured to target a specific section of route 141 by transmitting signals in a same or different beam pattern as the beam generated by a radar system of hubs 111-117 and/or structures 122.

The transponder system may transmit messages to one or more aircraft 131-133 located within the targeted section of route 141. The transponder system may periodically broadcast the message at predetermined intervals, enabling aircraft 131-133 to detect and receive the transmission. The messages may include positional data of the hub 111-117 and/or structure 122 to provide aircraft 131-133 with situational awareness of the nearby ground station(s). For example, the positional data may include a coordinate location and an altitude associated with those particular buildings. As described in further detail herein, aircraft 131-133 may receive the messages and utilize the positional data of the hubs 111-117 and/or structures 122 to determine a position of aircraft 131-133 relative to those ground stations and airspace 100.

The datalink system of each ground station (e.g., hubs 111-117, structures 122, etc.) may communicate with at least one of the one or more communications stations 124. Each of the one or more communications stations 124 may communicate with at least one of the one or more ground stations that is located within a certain distance or proximity (i.e., a predetermined region) from the communications station 124, to exchange data with the one or more ground station(s). A communications station 124 may communicate indirectly with ground station(s) that are located outside the predetermined region from the communications station 124. For example, a first communications station 124 may receive, from a second communications station 124, data that originates from ground stations located outside a predetermined region from the first communication station 124. In other words, the first communications station 125 may receive data indirectly from the ground stations located outside the predetermined region, by utilizing the second communication station 124 that is within a direct communication range from those ground stations. In one embodiment, each of the ground stations (e.g., hubs 111-117, structures 122, etc.) may communicate with a nearest one of the communications station(s) 124 (directly or indirectly) via a communication link 126. Additionally or alternatively, a ground station may communicate with a communications station 124 that has the best signal to the ground station, best bandwidth, etc. The one or more communications stations 124 may include a wireless communication system to communicate with the datalink system of ground station(s). The wireless communication system may enable cellular communication along communication link 126, in accordance with, e.g., 3G/4G/5G standards. The wireless communication system may further enable Wi-Fi communications, Bluetooth communications, or other short range wireless communications via communication link 126. Additionally or alternatively, the one or more communications stations 124 may communicate with one or more ground stations based on wired communication, such as Ethernet, fiber optic, etc.

The one or more communications stations 124 may also communicate with one or more aircraft, such as aircraft 131-133, to receive data from and transmit data to the one or more aircraft 131-133 via communication link 126. For instance, one or more communications stations 124 may relay data between a cloud service 150 and a vehicle, such as, e.g., first aircraft 131a. Cloud service 150 may communicate with the one or more communications stations 124 and/or directly (e.g., via satellite or radio communications) with aircraft 131-133, such as, e.g., first aircraft 131a. Cloud service 150 may provide instructions, data, data analysis and computations, and/or warnings to aircraft 131-133 and may receive acknowledgements, aircraft positional data, and/or other information from aircraft 131-133.

For instance, cloud service 150 may provide weather data, traffic data, landing zone data, etc. to hubs 111-117, and may provide updated obstacle data, flight plan data, and other flight-related data to aircraft 131-133. Cloud service 150 may also provide software as a service (SaaS) to aircraft 131-133 to perform various software functions, such as navigation services, Flight Management System (FMS) services, etc. As described in further detail herein, in some embodiments, cloud service 150 may be configured to execute data analysis and/or computation instructions received from one or more aircraft 131-133 to calculate a range, bearing, and/or position of aircraft 131-133 within airspace.

As indicated above, FIG. 1 is provided merely as an example environment of an airspace that includes exemplary types of aircraft, hubs, routes, and infrastructure. It should be appreciated that additional and/or fewer aircraft, hubs, routes, and/or infrastructure may be included in airspace 100 than those shown and described herein, without departing from a scope of this disclosure.

Figure 2:
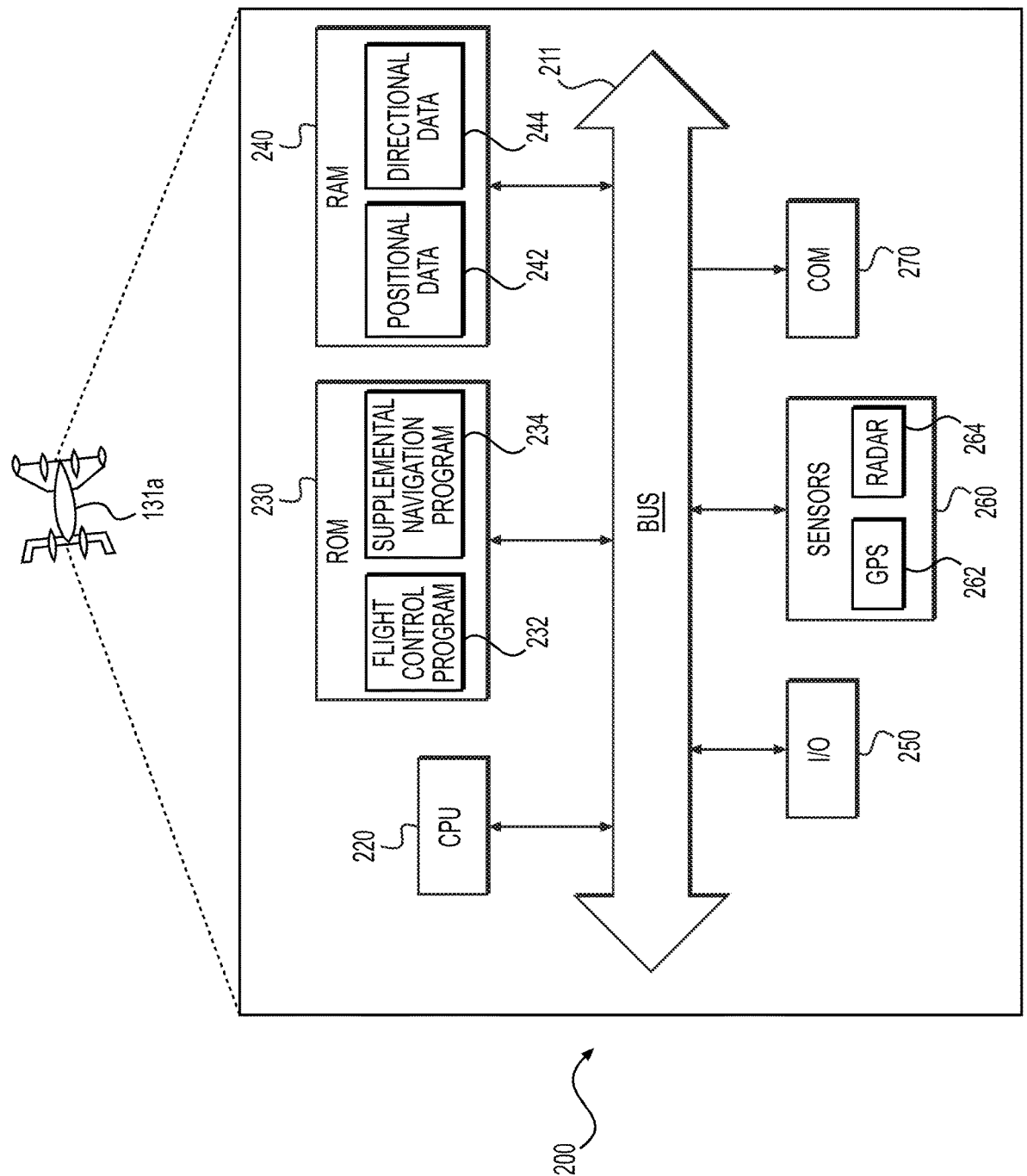
FIG. 2 depicts an exemplary block diagram of a management computer system according to one or more embodiments.

FIG. 2 depicts an example vehicle management computer system 200 (hereinafter system 200) of aircraft 131-133, such as, for example, first aircraft 131a. As described in further detail herein, system 200 of aircraft 131-133 may be configured to execute one or more techniques contemplated in the present disclosure. Specifically, system 200 may include electrical, mechanical, and/or software computer systems and/or infrastructure. System 200 may comprise one or more components in communication with each other via an internal communications bus 211.

System 200 may include a central processing unit ("CPU") 220 in the form of one or more processors for executing program instructions stored on a program storage and/or a data storage (e.g., such as ROM 230 and RAM 240). For example, ROM 230 may include program storage configured to store program instructions thereon including a flight control program 232 and a supplemental navigation program 234. RAM 240 may include data storage configured to store various data files thereon including positional data 242 and directional data 244. The program instructions stored on ROM 230 and the data stored on RAM 240 may be communicated by bus 211 to CPU 220 where additional processing takes place, in order to control and manage operation of aircraft 131a (e.g., manually, semi-autonomously, or autonomously) in accordance with flight control program 232.

As described in detail herein, positional data 242 and directional data 244 may be generated by one or more other components of system 200, such as, for example, a sensor 260. In some embodiments, system 200 may receive one or more of positional data 242 and/or directional data 244 from other aircraft 131-133 and/or ground stations via network communications, and the received data may be stored onto the data storage systems onboard aircraft 131a, such as, for example, on RAM 240. It should be appreciated that the one or more data storage systems (e.g., ROM 230, RAM 240) may store additional data, software, and/or program algorithms for execution by one or more computer systems onboard aircraft 131a (e.g., CPU 220), in addition to those shown and described herein.

As described in further detail below, supplemental navigation program 234 may be configured to solicit and determine one or more of positional data 242 and/or directional data 244 of aircraft 131a when an on-board vehicle navigation system of aircraft 131a (e.g., sensor 260) is inoperable or otherwise unreliable. System 200 may further include input and output ports 250 to connect with input and output devices such as keyboards, mice, touchscreens, monitors, displays, etc. Of course, the various system functions may be implemented in a distributed fashion on a number of similar platforms, to distribute the processing load of system 200. Alternatively, the systems may be implemented by appropriate programming of one computer hardware platform.

Although not shown, it should be appreciated that system 200 may further include one or more display(s) and/or interface(s) to receive and communicate information from users of the aircraft 131*a*. System 200 may further include one or more transponder(s), camera(s), and/or sensors 260, such as, for example, an on-board vehicle navigation systems. In the example, sensor 260 may include a Global Positioning System (GPS) 262. Generally, GPS 262 may be a navigation system configured to determine positional data 242 (e.g., vehicle state, position, speed, orientation, heading, track, etc.) and directional data 244 (e.g., (e.g., tracking information, range, bearing, etc.) associated with nearby entities, which may encroach upon a safety envelope of aircraft 131*a*. Such nearby entities may include, for example, airborne vehicles/objects, ground terrain, physical infrastructure, and more.

In some embodiments, GPS 262 may include a primary navigation sensor in the form of one or more global navigation satellite (GNSS) receivers configured to receive signals from the United States developed Global Position System (GPS), the Russian developed Global Navigation Satellite System (GLONASS), the European Union developed Galileo system, and/or the Chinese developed BeiDou system, or other global or regional satellite navigation systems. GNSS receiver may determine positional data 242 for aircraft 131*a*, which may include information about one or more of a position (e.g., latitude and longitude, or Cartesian coordinates), an altitude, a speed, a heading, a track, and the like for aircraft 131*a*.

In other embodiments, sensors 260 may include a radar sensor 264 (e.g., light weight digital radar, DAPA radar, etc.) that may be either omnidirectional and/or directional. Radar sensor 264 may be configured to scan and obtain radar information for various terrain, ground, objects, obstacles (e.g., aircraft), etc. in a vicinity of aircraft 131*a*, such as, for example, associated locations and/or movement of the nearby objects. In the present example, radar sensor 264 may determine directional data 244 for aircraft 131*a*, which may include information about a range and/or bearing of objects or obstacles within a vicinity of aircraft 131*a*.

In other embodiments, sensor 260 may further include a magnetometer(s), an attitude heading reference system (AHRS), and/or an air data module(s). For example, the magnetometer may measure magnetism to obtain bearing information for aircraft 131*a*. The AHRS may include sensors (e.g., three sensors on three axes) to obtain attitude information for aircraft 131*a*, which may include roll, pitch, and yaw of aircraft 131*a*. The air data module(s) may sense external air pressure to obtain airspeed information for aircraft 131*a*. It should be understood that sensors 260 may include additional sensors than those shown and described herein, such as, for example, an imaging sensor (e.g., camera), an antenna sensor (e.g., ADS-B or communication system), and more.

Still referring to FIG. 2, GPS 262 and radar sensor 264 (collectively, sensor 260) may provide positional data 242 and directional data 244, which may collectively include information relating to a vehicle state, tracking, radar, bearing, attitude, airspeed, and/or position (collectively referred to herein as location information) to CPU 220 and/or a user of aircraft 131-133, which may thereby use the location information to control (e.g., manually, semi-autonomously, or autonomously) aircraft 131*a* in accordance with flight control program 232 stored in ROM 230.

System 200 may further include a communication module 270 which may include various datalink systems (e.g., satellite communications systems), cellular communications systems (e.g., LTE, 4G, 5G, etc.), radio communications systems (e.g., HF, VHF, etc.), and/or wireless local area network communications systems (e.g., Wi-Fi, Bluetooth, etc.). As described in further detail herein, system 200 may be configured to communicate via ultra-reliable low latency connections (URLLC) (e.g., 5G wireless communication networks) with communication module 270 when, for example, executing supplemental navigation logic. Communication module 270 may enable communications between aircraft 131*a* and external networks, services, hubs 111-117, structures 122, communications stations 124, and cloud service 150. An example of the external networks may include a wide area network, such as the Internet, and examples of the services may include weather information services, traffic information services, etc.

In some embodiments, communication module 270 may include one or more transponder(s), such as, for example, an ADS-B, a Mode S transponder, and/or other transponder system. Communication module 270 may have an omnidirectional and/or a directional antenna configured to transmit and receive signals. For instance, in response to receiving a positioning message request from a nearby aircraft 131-133, the transponder of communication module 270 may determine positional data 242 (e.g., speed, location, altitude, track, etc.) and/or directional data 244 (e.g., range, bearing, etc.) of aircraft 131*a* (e.g., via sensors 260) and transmit the location information to the originator of the positioning message request. Additionally or alternatively, the transponder of communication module 270 may transmit positioning message requests to nearby aircraft 131-133 and/or ground stations (e.g., hubs 111-117, structures 122, and communications stations 124) to receive location information in return.

CPU 220 may be configured to, when executing supplemental navigation program 234, solicit and obtain positional data 242 (originally obtained by GPS 262) and/or directional data 244 (originally obtained by radar sensor 264) from one or more nearby terminals (e.g., hubs 111-117, structures 122, communications systems 124, aircraft 131-133, etc.) to determine a vehicle state, tracking, radar, bearing, attitude, airspeed, and/or positioning of aircraft 131*a* upon detecting a failure event of sensors 260. CPU 220 may be further configured to, when executing supplemental navigation program 234, determine and transmit location information of aircraft 131*a* upon receiving a request from a nearby terminal (e.g., aircraft 131-133).

As described in detail herein, aircraft 131*a* may perform one or more of the aforementioned operations of supplemental navigation program 234 using the components of system 200. Supplemental navigation program 234 may provide system 200 with positional data 242 and/or directional data 244 for controlling a flight path of aircraft 131*a* by changing a speed, heading, altitude (e.g., manually, semi-autonomously, autonomously) in accordance with flight control program 232 based on the location information received from nearby terminals in lieu of sensors 260. The location information received from other terminals (e.g., latitude, longitude, altitude, time coordinates, range, bearing, etc.) may be stored on RAM 240.

Current piloted systems have a single onboard navigation system to determine a positioning of aircraft 131*a* and to help a pilot execute safe aviation and navigation. However, aircrafts, such as aircraft 131*a*, may experience system component failures at the onboard navigation system (e.g., sensors 260) during an active flight, which may be detrimental to safe operation of aircraft 131*a*. By implementing supplemental navigation program 234 in system 200, aircraft 131*a* may be able to maintain situational awareness and safety of the aircraft 131*a* itself and other nearby terminals (e.g., hubs 111-117, structures 122, communications systems 124, aircraft 131-133, etc.) when sensors 260 experiences failure.

To maintain situational awareness and safety of aircraft 131*a* in the event that sensors 260 experience failure and while hosting minimal physical infrastructure and computing equipment onboard, system 200 may be implemented to utilize high-speed low-latency wireless communications to perform one or more processing activities that would have otherwise been performed by sensors 260. It should be appreciated that inclusion of supplemental navigation program 234 on system 200 may allow certain functionalities of sensors 260 to be performed by a secondary navigation system onboard aircraft 131*a*, when sensor 260 is in an inoperable or unreliable state. System 200 may offload certain functions to the nearby terminals when executing the supplemental navigation program 234, such as, for example, navigation data processing to generate one or more of positional data 242 and/or directional data 244.

Figure 3:
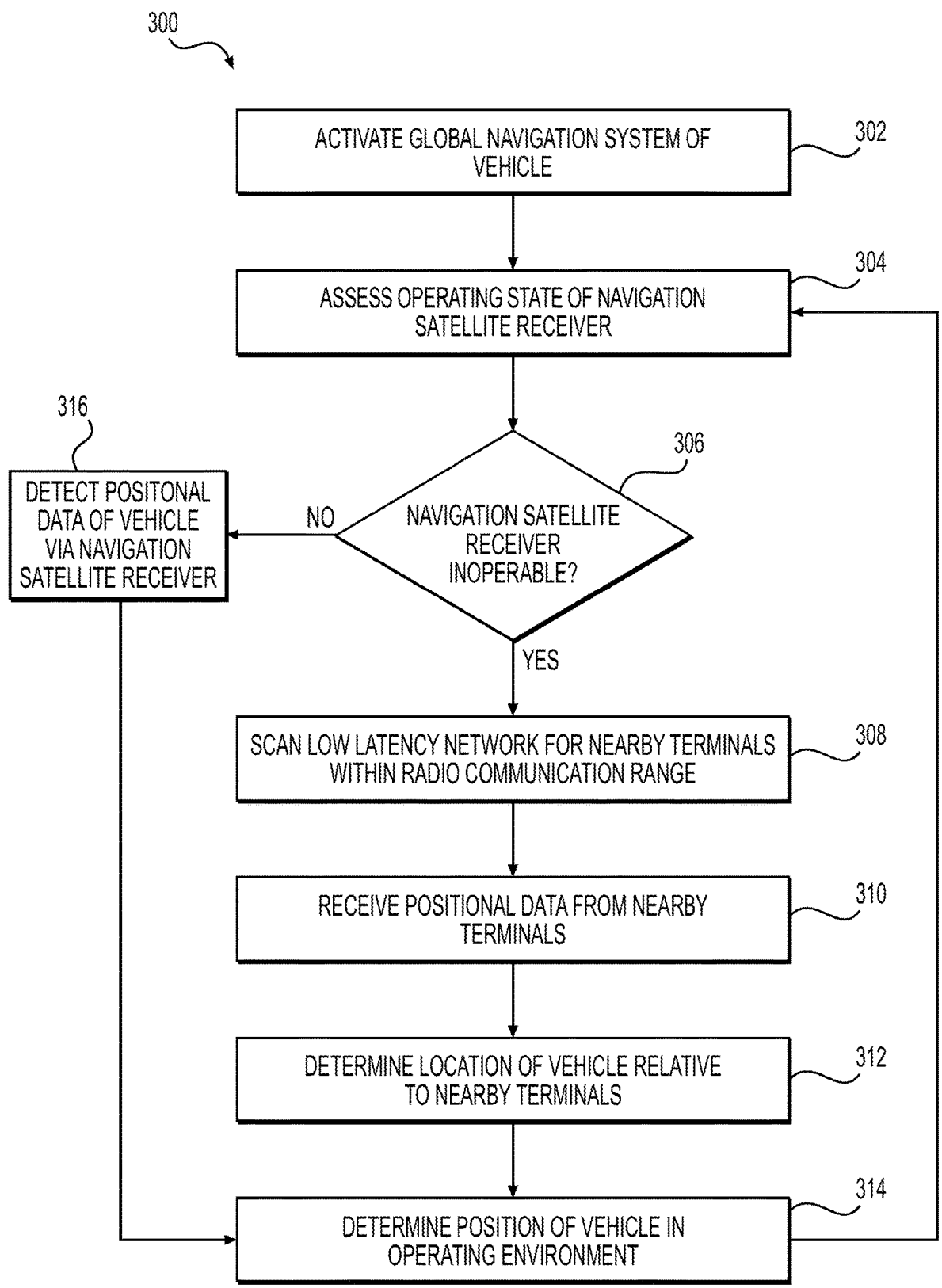
FIG. 3 depicts an exemplary flowchart for supplemental navigation processing of a vehicle upon failure of a navigation satellite system, according to one or more embodiments.

FIG. 3 is a flowchart illustrating an exemplary method for distributed navigation processing, according to one aspect of the present disclosure. Particularly, method 300 may depict distributed avionics processing enabling supplemental navigation capability. For example, method 300 may correspond to the algorithm executed by the supplemental navigation program 234 described above with respect to FIG. 2. The method 300 may be performed by one or more aircraft 131-133, such as, for example, aircraft 131*a*.

At step 302, a processor (e.g., CPU 220 in FIG. 2) implemented on the aircraft 131*a*, or system 200, may activate the navigation system onboard aircraft 131*a* (e.g., sensors 260) during or at the beginning of an active flight. At step 304, CPU 220 may be configured to, when executing supplemental navigation program 234, cause system 200 to periodically assess an operating state of GPS 262 at a predetermined interval during the active flight of aircraft 131*a*. The predetermined interval may be stored on the one or more data storage systems of system 200 (e.g., ROM 230, RAM 240) and may range from about 1 second to about 60 seconds, such as, for example, about 30 seconds. However, it should be noted that the predetermined interval may be any configurable value, and may not be limited to the specific examples discussed herein.

At step 306, CPU 220, in accordance with the executable instructions of supplemental navigation program 234, may be configured to determine whether GPS 262 is operable by evaluating whether one or more trigger conditions are satisfied. For example, a trigger condition may include continued detection of positional data 242 by GPS 262 during the active flight of aircraft 131*a*, continued recordation of positional data 242 onto RAM 240 during the active flight of aircraft 131*a*, or any other condition indicative of normal or abnormal operating state of GPS 262. In other examples, a trigger condition may include detecting a weak signal strength (e.g., degraded GNSS signal) by GPS 262 (e.g., GNSS receiver) for determining positional data 242 despite GPS 262 being in a fully operable state. It should be understood that other types of trigger conditions that may be suitable for detecting the operating state of GPS 262 can also be used, without departing from a scope of this disclosure.

In response to determining at step 306 that GPS 262 is functioning properly and in an operable state, CPU 220, in accordance with supplemental navigation program 234, may detect positional data 242 via GPS 262 at step 316. At step 314, CPU 220 may utilize positional data 242 obtained by GPS 262 to determine a location of aircraft 131*a* within an operating environment of aircraft 131*a* (e.g., airspace 100). It should be appreciated that a current position of aircraft 131*a* in airspace 100 may be determined by system 200 upon detection of positional data 242 and/or directional data 244, such as, for example, from radar sensor 264. As described in further detail herein, CPU 220 may be configured to determine an operating state of radar sensor 264 prior to, simultaneously with, and/or after one or more steps of method 300 (e.g., FIG. 4).

Upon determining a current position of aircraft 131*a* in airspace 100 at step 314, CPU 220 may be configured to return to step 304 to await the predetermined interval prior to reassessing the operating state of GPS 262. It should be appreciated that supplemental navigation program 234, when executed by CPU 220, may continuously evaluate the operating state of GPS 262 throughout an active flight of aircraft 131*a* until GPS 262 is deactivated at the conclusion of the flight. In this instance, system 200 may obtain positional data 242 for use by GPS 262 to determine a position of aircraft 131*a* via the GNSS receiver.

In other embodiments, one or more of steps 304 and 306 may be executed manually by a user of aircraft 131*a* in lieu of CPU 220. In this instance, a user may periodically assess a current operating condition of GPS 262 at step 304 during an active flight. The user may further determine whether GPS 262 remains in an operating state at step 306 during the active flight. Accordingly, initiation of step 308 may take place in response to a manual actuation and/or user feedback received by system 200, such as, for example, via input ports 250.

In response to detecting at least one trigger condition indicative of an abnormal operating state (e.g., inoperable or unreliable state) of GPS 262 at step 306, CPU 220 may be configured to initiate a scan of high-speed low-latency wireless communications (e.g., URLLC 5G networks) with communication module 270 at step 308. In this instance, GPS 262 may be in a failure state and in accordance with supplemental navigation program 234, CPU 220 may identify one or more other terminals (e.g., hubs 111-117, structures 122, communications stations 124, aircraft 131-133, etc.) within radio communication range of aircraft 131*a*. In the present example, as shown in FIG. 1, one or more terminals may be located in a vicinity of aircraft 131*a*, such as, for example, one or more of hub 113, aircraft 132*a*, aircraft 133*a*, and/or structure 122. Aircraft 131*a* may be configured to communicate with the nearby terminals via URLLC links 128 dispatched from communication module 270 and received by a corresponding communication module of the terminal from which positional data 242 and/or directional data 244 are requested.

It should be appreciated that by communicating via high-speed low-latency wireless communications, aircraft 131*a* may be able to communicate with the other terminals directly via URLLC links 128 in lieu of relaying communications through a cell tower, such as, for example, communications station 124. In this instance, the other terminals (e.g., hub 113, aircraft 132a, aircraft 133a, and structure 122) may utilize an onboard sensor(s) 260 (e.g., GNSS receiver) to determine its respective speed, acceleration, velocity, altitude, position (i.e., positional data). At step 310, aircraft 131a may receive positional data 242 detected by sensor(s) 260 of the respective nearby terminals. CPU 220, in accordance with the executable instructions of supplemental navigation program 234, may store positional data 242 received from the nearby terminals in RAM 240. In other embodiments, positional data 242 may be stored remotely from system 200, such as, for example, on cloud service 150 to minimize resource usage (e.g., energy, payload, etc.) in aircraft 131a.

At step 312, CPU 220 may be configured to determine a location of aircraft 131a relative to airspace 100 based at least in part on positional data 242 received from one or more of hub 113, aircraft 132a, aircraft 133a, and structure 122. For example, a location of aircraft 131a may be computed by invoking triangulation processing, dependent position processing, and/or image processing functions of supplemental navigation program 234. In the present example, CPU 220 may be configured to calculate a triangulation of aircraft 131a at step 312 utilizing positional data 242 of the nearby terminals within airspace 100. CPU 220 may be further configured to perform an integrity check of positional data 242 received from the one or more nearby terminals when triangulating a position of aircraft 131a.

In this instance, CPU 220 may execute error detection and exclusion algorithms of supplemental navigation program 234 to identify faulty measurements and avoid inaccuracies in determining a location of aircraft 131a at step 312. By way of illustrative example, CPU 220 may be configured to analyze positional data 242 from each respective terminal (e.g., hub 113, aircraft 132a, aircraft 133a, and structure 122) for comparison with one another, in order to evaluate an integrity of the received data. Upon identifying data from a particular terminal (e.g., aircraft 132a) that differs significantly from corresponding data received from one or more other nearby terminals (e.g., hub 113, aircraft 133a, and structure 122), CPU 220 may be configured to categorize the subject data from aircraft 132a as an outlier for exclusion from the computation at step 312.

In some embodiments, CPU 220 may be configured to determine whether positional data 242 is categorized as an outlier by measuring a variability of the data from aircraft 132a to the data received by one or more other nearby terminals (e.g., hub 113, aircraft 133a, and structure 122) and comparing the variability to a predetermined threshold stored in the one or more data storage systems of system 200 (e.g., ROM 230, RAM 240). Accordingly, CPU 220 may be configured to exclude positional data 242 from aircraft 132a when the measurement of variability exceeds the predetermined threshold value. In other embodiments, CPU 220 may group the received positions of nearby terminals that are within a threshold distance of each other together. CPU 220 may further exclude any outliers that are not within the threshold distance of a majority of the terminals.

In some embodiments, CPU 220 may be configured to execute the one or more instructions associated with computing the triangulation calculation of supplemental navigation program 234, while in other embodiments the computation may be executed remotely from system 200. By way of example, CPU 220 may be configured to transmit positional data 242 received from the nearby terminals at step 310 to a remote station, such as, for example, cloud service 150. In this instance, system 200 may save computing power and resources by offloading the processing and computation necessitated by supplemental navigation program 234 to a remote station. Cloud service 150 may then transmit a resolved position determination of aircraft 131a to system 200 via a cloud response.

At step 314, upon triangulating a location of aircraft 131a relative to the one or more nearby terminals in radio communication range with aircraft 131a (e.g., hub 113, aircraft 132a, aircraft 133a, and structure 122), CPU 220 may be configured to perform a position resolution process to determine a current position of aircraft 131a relative to airspace 100. Stated differently, system 200 may utilize positional data 242 received from the one or more nearby terminals, including a position of the terminals in airspace 100, to determine a current position of aircraft 131a within airspace 100 upon triangulating the location of aircraft 131a at step 312. Accordingly, CPU 220 may determine a current position of aircraft 131a along first route 141a (FIG. 1) to determine a relative travel distance between a start location of first route 141a (e.g., hub 111) and an end location of first route 141a (e.g., hub 117).

In examples of an autonomous and/or semi-autonomous vehicle, CPU 220 may control one or more actuation systems of aircraft 131a to control flight of aircraft 131a. For example, CPU 220, in accordance with flight control program 232, may control a current speed, altitude, bearing, etc. of aircraft 131a based on the determinations at steps 312 and 314 of supplemental navigation program 234. CPU 220 may then proceed to perform a navigation control process based on the determined position of aircraft 131a. For instance, CPU 220 may control aircraft 131a in accordance with control logic and/or instructions of flight control program 232. In examples of aircraft 131a being controlled manually by a user, the determinations of steps 312 and 314 may be provided to the user in real-time for use in operating aircraft 131a, such as, for example, via output ports 250.

CPU 220 may be configured to return to step 304 upon determining a position of aircraft 131a at step 314 to reassess an operating state of GPS 262. It should be appreciated that steps 308 to 314 may be continuously repeated during an active flight of aircraft 131a in response to repeatedly determining that GPS 262 is inoperable at step 306. However, in response to determining GPS 262 has resumed an adequate operating condition at step 306, CPU 220 may cease execution of steps 308 to 312 of supplemental navigation program 234 and utilize GPS 262 at step 316 to determine a current position of aircraft 131a within airspace 100. Accordingly, it should be appreciated that utilization of sensor(s) 260 may be prioritized by system 200 when an operability of sensor(s) 260 is returned to a fully functioning or otherwise reliable state.

Figure 4:
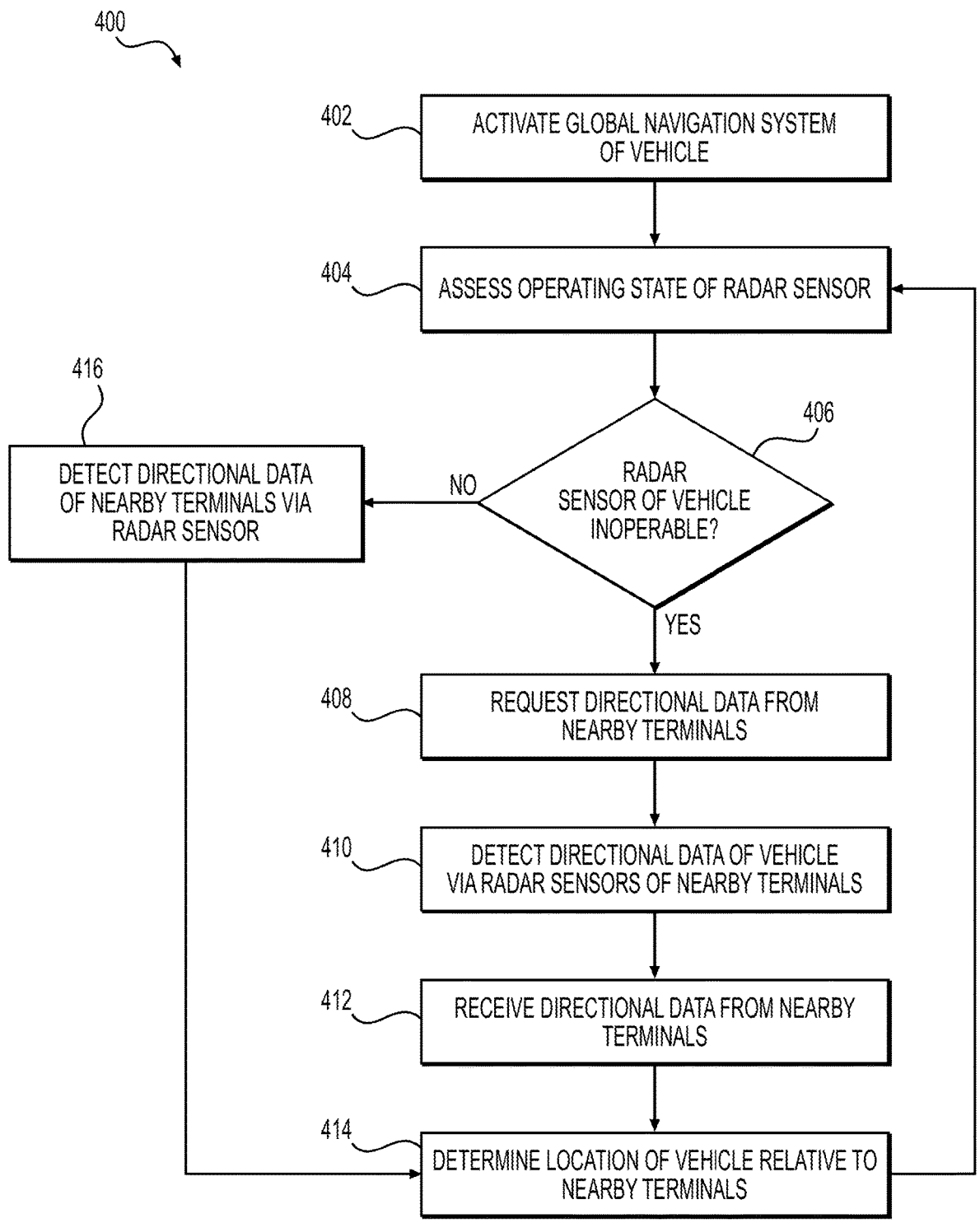
FIG. 4 depicts an exemplary flowchart for supplemental navigation processing of a vehicle upon failure of a radar sensor, according to one or more embodiments.

FIG. 4 is a flowchart illustrating another exemplary method distributed navigation processing, according to one aspect of the present disclosure. Particularly, the method 400 may depict distributed avionics processing enabling supplemental navigation capability. For example, method 400 may correspond to the algorithm executed by the supplemental navigation program 234 described above with respect to FIG. 2. The method 400 may be performed by one or more aircraft 131-133, such as, for example, aircraft 131a. It should be appreciated that CPU 220 of system 200 may be configured to perform the one or more steps of method 400 before, simultaneously with, and/or after the steps of method 300 described above.

At step 402, CPU 220 of aircraft 131a (or system 200) may activate sensor(s) 260 during or at the beginning of an active flight. It should be understood that step 402 of method 400 may be substantially similar to step 302 of method 300, and the one or more succeeding steps of each may be executed concurrently with one another. At step 404, CPU 220 may be configured to, when executing supplemental navigation program 234, cause system 200 to periodically assess an operating state of radar sensor 264 at a predetermined interval during the active flight of aircraft 131a. The predetermined interval may be stored on ROM 230 and/or RAM 240 and may be similar to the interval for assessing GPS 262 described above at step 304 of method 300.

At step 406, CPU 220, in accordance with the executable instructions of supplemental navigation program 234, may be configured to determine whether radar sensor 264 is operable by evaluating whether one or more trigger conditions are satisfied (e.g., detection of directional data 244 by radar sensor 264, recordation of directional data 244 onto RAM 240, detecting a weak radio wave signal by radar sensor 264, etc.). It should be understood that various other suitable trigger conditions may be considered in determining the operating state of the radar sensor 264, without departing from a scope of this disclosure. In response to determining that radar sensor 264 is functioning properly and in an operable state at step 406, CPU 220 may detect directional data 244 via radar sensor 264 at step 416 and utilize said directional data 242 to determine a location of aircraft 131a relative to other terminals in airspace 100 at step 414.

CPU 220 may be configured to return to step 404 to await the predetermined interval prior to reassessing the operating state of radar sensor 264. It should be appreciated that supplemental navigation program 234, when executed by CPU 220, may continuously evaluate the operating state of radar sensor 264 throughout an active flight of aircraft 131a until sensor(s) 260 is deactivated at the conclusion of the flight. In this instance, system 200 may obtain directional data 244 for use by sensor(s) 260 to determine a location of aircraft 131a relative to other terminals via radar sensor 264.

In other embodiments, one or more of steps 404 and 406 may be executed manually by a user of aircraft 131a in lieu of CPU 220. In this instance, a user may periodically assess a current operating condition of radar sensor 264 at step 404 and/or determine whether radar sensor 264 remains in an operating state at step 406 during the active flight. Accordingly, initiation of step 408 may take place in response to a manual actuation and/or user feedback received by system 200, such as, for example, via input ports 250.

In response to detecting at least one trigger condition indicative of an abnormal operating state (e.g., inoperable or unreliable state) of the radar sensor 264 at step 406, CPU 220 may be configured to request directional data 244 from the one or more nearby terminals (e.g., hubs 111-117, structures 122, communications stations 124, aircraft 131-133, etc.) within radio communication range of aircraft 131a at step 408.

For example, with radar sensor 264 in a failure or otherwise unreliable state, system 200 may be configured to transmit a signal indicative of a message request to the nearby terminals via communication module 270. The signal may be transmitted via high-speed low-latency wireless communications (e.g., URLLC 5G networks) at step 408. As described in detail above with respect to method 300 and as shown in FIG. 1, one or more terminals may be positioned in a vicinity of aircraft 131a, such as, for example, hub 113, aircraft 132a, aircraft 133a, and/or structure 122. Aircraft 131a may be configured to communicate with the nearby terminals via URLLC links 128 dispatched from communication module 270 and received by a corresponding communication module of the terminal from which directional data 244 is requested.

In this instance, the other terminals (e.g., hub 113, aircraft 132a, aircraft 133a, and structure 122) may utilize an onboard sensor (e.g., GPS, radar sensor) to determine its respective range and bearing (i.e., directional data 244) relative to nearby objects, vehicles, and/or other terminals. At step 412, aircraft 131a may receive directional data 244 detected by sensor(s) 260 of the respective one or more nearby terminals at step 410. CPU 220, in accordance with the executable instructions of supplemental navigation program 234, may store directional data 244 received from the one or more nearby terminals in RAM 40 and/or remotely from system 200, such as, for example, on cloud service 150.

At step 414, CPU 220 may be configured to determine a location of aircraft 131a relative to the nearby terminals in radio communication range with aircraft 131a based at least in part on directional data 244 received from one or more of hub 113, aircraft 132a, aircraft 133a, and structure 122. For example, directional data 244 detected by the nearby terminals within airspace 100 may include a relative location of aircraft 131a to the terminals, such as a distance, track, heading, etc. CPU 220 (or cloud service 150) may be further configured to perform an integrity check of directional data 244 received from the one or more nearby terminals when determining a location of aircraft 131a relative to the nearby terminals. The error detection and exclusion algorithms of supplemental navigation program 234 may be substantially similar to those described above in reference to method 300 of FIG. 3.

In examples of an autonomous and/or semi-autonomous vehicle, CPU 220 may control one or more actuation systems of aircraft 131a to control flight of aircraft 131a. For example, CPU 220, in accordance with flight control program 232, may control a current speed, altitude, bearing, etc. of aircraft 131a based on the determination at step 414 of supplemental navigation program 234. CPU 220 may then proceed to perform a navigation control process based on the determined location of aircraft 131a relative to the nearby terminals. For instance, CPU 220 may control aircraft 131a in accordance with control logic and/or instructions of flight control program 232, or provide the determinations at step 414 to the user in real-time for use in operating aircraft 131a.

CPU 220 may be configured to return to step 404 upon determining a relative location of aircraft 131a at step 414 to reassess an operating state of radio sensor 264. It should be appreciated that steps 408 to 414 may be continuously repeated during an active flight of aircraft 131a in response to repeatedly determining that radio sensor 264 is inoperable at step 406. However, in response to determining radio sensor 264 has resumed an adequate operating condition at step 406, CPU 220 may cease execution of steps 408 to 414 of supplemental navigation program 234 and utilize radio sensor 264 at step 416 to determine a current location of aircraft 131a at step 414. Accordingly, it should be appreciated that utilization of sensor(s) 260 may be prioritized by system 200 when an operability of radio sensor 264 is returned to a fully functioning or otherwise reliable state.

Therefore, generally, the methods and systems of the present disclosure may enable obtaining precise location information of an aircraft by cross-referencing multiple data sources, thereby improving failure margin as multiple means of supplementing navigation are used. Furthermore, as the methods and systems of the present disclosure rely on the benefit of path planning in UAM (with routes 141), specific beacons and known references may be used and/or learned over time.

It should be appreciated that one or more of local processing functions of CPU 220 and/or data storage functions of ROM 230 and/or RAM 240 described above in method 300 and method 400 may be offloaded to a remote station (e.g., cloud service 150) to preserve processing power and memory of system 200. Providing one or more of the processing or data storage functions off system 200 may allow aircraft 131a to include less physical or software infrastructure to provide the corresponding functionality shown and described above.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A method for vehicle navigation processing of a vehicle within an environment, comprising:
  determining a failure condition associated with a navigation sensor of the vehicle is satisfied;
  scanning for terminals within a predetermined vicinity of the vehicle via a 5G communication network;
  establishing, via the 5G communication network, communication with one or more terminals discovered based on the scanning:

receiving, from the one or more terminals, positional data of the one or more terminals via the 5G communication network;
receiving directional data of the one or more terminals relative to the vehicle;
determining a first location of the vehicle relative to the one or more terminals based on the directional data;
determining a second location of the vehicle relative to the environment based on the positional data and the first location;
periodically evaluating a condition of the navigation sensor of the vehicle to determine whether the failure condition remains satisfied;
terminating communication with the one or more terminals via the 5G communication network in response to determining the failure condition is not satisfied; and
after terminating communication with the one or more terminals, receiving positional data of the vehicle from the navigation sensor of the vehicle.

2. The method of claim 1, further comprising:
transmitting the positional data and the directional data to a cloud node such that the first location and the second location of the vehicle are determined at the cloud node remote from the vehicle.

3. The method of claim 2, further comprising:
receiving a cloud response from the cloud node, the cloud response comprising the second location of the vehicle relative to the environment.

4. The method of claim 1, further comprising:
periodically reevaluating the condition of the navigation sensor of the vehicle, while continuing to receive the positional data of the vehicle from the navigation sensor, to determine whether the failure condition returns.

5. The method of claim 1, wherein the directional data of the one or more terminals relative to the vehicle are received via a radar sensor of the vehicle.

6. The method of claim 5, further comprising:
determining a failure state associated with the radar sensor of the vehicle is satisfied; and
receiving directional data of the one or more terminals relative to the vehicle via a radar system of the one or more terminals.

7. The method of claim 6, further comprising:
periodically evaluating a state of the radar sensor of the vehicle to determine whether the failure state remains satisfied.

8. The method of claim 7, further comprising:
terminating receipt of directional data from the one or more terminals via the 5G communication network in response to determining the failure state is not satisfied; and
receiving directional data of the one or more terminals from the radar sensor of the vehicle.

9. The method of claim 8, further comprising:
periodically reevaluating the state of the radar sensor of the vehicle, while continuing to receive the directional data of the one or more terminals from the radar sensor of the vehicle, to determine whether the failure state returns.

10. The method of claim 1, wherein the failure condition of the navigation sensor is satisfied when a global navigation satellite systems (GNSS) signal strength of the navigation sensor is below a threshold.

11. The method of claim 1, further comprising:
performing a navigation control process in response to determining the second location of the vehicle relative to the environment.

12. The method of claim 1, wherein the one or more terminals include one or more of: a mobile vehicle and a ground station.

13. The method of claim 1, wherein the one or more terminals is comprised of at least two terminals, wherein a first terminal of the at least two terminals is an aircraft, and a second terminal of the at least two terminals is a structure.

14. A cross-vehicle navigation system of a vehicle, comprising:
a navigation sensor;
at least one processor; and
at least one non-transitory computer-readable medium storing instructions that, when executed by the at least one processor, cause the at least one processor to perform operations comprising:
detecting failure of the navigation sensor of the vehicle;
establishing communication with one or more terminals located within a communication range of the vehicle via a 5G network;
receiving, from the one or more terminals, positional data of the one or more terminals via the 5G network;
receiving directional data of the one or more terminals relative to the vehicle;
determining a first location of the vehicle relative to the one or more terminals based on the directional data;
determining a second location of the vehicle relative to an operating environment of the vehicle based on the first location and the positional data;
evaluating a condition of the navigation sensor at periodic intervals to determine whether a failure condition representative of the failure remains satisfied;
ceasing communication with the one or more terminals via the 5G network in response to determining the failure condition is not satisfied; and
after ceasing communication with the one or more terminals, receiving positional data of the vehicle from the navigation sensor.

15. The cross-vehicle navigation system of claim 14, further comprising a radar sensor, and wherein the directional data of the terminal relative to the vehicle are received via the radar sensor of the vehicle and the operations further comprise:
determining a failure state associated with the radar sensor is satisfied; and
receiving directional data of the terminal relative to the vehicle via a radar system of the terminal.

16. The cross-vehicle navigation system of claim 15, to the operations further comprising:
evaluating a state of the radar sensor of the vehicle at periodic intervals to determine whether the failure state remains satisfied;
ceasing receipt of directional data from the terminal via the 5G network in response to determining the failure state is not satisfied; and
receiving the directional data of the terminal relative to the vehicle from the radar sensor of the vehicle.

17. The cross-vehicle navigation system of claim 15, wherein the one or more terminals is comprised of at least two terminals, wherein a first terminal of the at least two terminals is an aircraft, and a second terminal of the at least two terminals is a structure.

18. A method for navigating a vehicle within an environment, comprising:
- determining a failure condition associated with a navigation sensor of the vehicle is satisfied;
- identifying a plurality of terminals located within a predetermined radio communications range of the vehicle;
- establishing communication with the plurality of terminals via a 5G communication signal;
- requesting directional data of the plurality of terminals, wherein the directional data of the plurality of terminals is relative to the vehicle;
- determining a local location of the vehicle relative to the plurality of terminals based on the directional data;
- requesting positional data of the plurality of terminals from the plurality of terminals via the 5G communication signal, wherein the positional data of the plurality of terminals is relative to the environment;
- determining a global location of the vehicle relative to the environment based on the positional data and the local location;
- periodically evaluating a condition of the navigation sensor of the vehicle to determine whether the failure condition remains satisfied;
- terminating communication with the plurality of terminals via the 5G communication signal in response to determining the failure condition is not satisfied; and
- after terminating communication with the plurality of terminals, receiving positional data of the vehicle from the navigation sensor of the vehicle.

19. The method of claim 18, wherein the directional data of the plurality of terminals is received from:
- a radar sensor of the vehicle, or
- radar systems of the plurality of terminals in response to the radar sensor of the vehicle satisfying a failure condition.

20. The method of claim 18, wherein the plurality of terminals is comprised of at least a first terminal and a second terminal, wherein the first terminal is an aircraft, and the second terminal is a structure.

* * * * *